(12) United States Patent
Myhre et al.

(10) Patent No.: US 6,579,552 B1
(45) Date of Patent: Jun. 17, 2003

(54) COMPRESSED BALE METHOD

(75) Inventors: Roger R. Myhre, Stillwell, KS (US);
Lawrence K. Cooper, Declo, ID (US);
Jeffrey K. Cooper, Oakley, ID (US);
Daniel L. Peterson, Coeur d'Alene, ID (US); James A. Cooper, Oakley, ID (US)

(73) Assignees: Agrex, Inc., Overland Park, KS (US);
CooperEquipment, Inc., Burley, IN (US)

( * ) Notice: Subject to any disclaimer, the term of this patent is extended or adjusted under 35 U.S.C. 154(b) by 46 days.

(21) Appl. No.: 09/661,102

(22) Filed: Sep. 13, 2000

(51) Int. Cl.$^7$ .......................... A01F 15/00; A01D 85/00
(52) U.S. Cl. .................. 426/420; 426/454; 426/518; 426/636; 83/35; 100/3; 100/39
(58) Field of Search ................................. 426/132, 420, 426/636, 518, 454, 464; 100/6, 3, 39; 83/35, 39, 8, 27

(56) References Cited

U.S. PATENT DOCUMENTS

| | | | |
|---|---|---|---|
| 5,017,399 A | * 5/1991 | Montano et al. | 426/636 |
| 5,893,309 A | 4/1999 | Ast | 83/35 |
| 6,339,986 B1 | * 1/2002 | Van Hierden | 100/6 |

* cited by examiner

Primary Examiner—Nina Bhat
(74) Attorney, Agent, or Firm—Lathrop & Gage, L.C.

(57) ABSTRACT

The present invention relates to a method for forming a compressed and cut bale of fibrous material, whereby the bale of fibrous material has at least one cut that allows the material to be separated into two distinct and separate layers. The present invention also relates to the compressed and cut fibrous material.

5 Claims, 3 Drawing Sheets

COMPRESSED BALE METHOD

FIELD OF INVENTION

The present invention relates to a method for producing compressed and sliced bales of fibrous material, whereby each bale has at least one cut that passes therethrough and allows the bale to be separated into at least two separate and distinct layers. The present invention also relates to the resultant bale of fibrous material.

BACKGROUND OF INVENTION

Many countries, such as Japan, do not have sufficiently available acreage to grow or elect not to grow various forms of animal fodder and forage used to feed animals that consume forage and fodder, such as cows. For this reason, it is necessary for end users in these countries to import animal fodder and/or forage for use in feeding various animals. To satisfy demand in these countries, hay or alfalfa and other forage and fodder crops are baled and compressed into tightly bound rectangular or square units and exported.

Originally, hay bales were relatively small rectangular objects that could be picked up and thrown by a person. If such bales were to be shipped, they were compacted to substantially eliminate air found in the bale. However, with the advent of modern farming practices, the size of the bales increased. As the bales increased in size, it became necessary to use machines to move such bales. Resultingly, in order to ship large bales, it became necessary to chop or reduce in size the large bales and to compact the material that formed the bale. The compaction process often involved grinding or cutting the forage material and the compacting such material. This process unfortunately resulted in compacted bales that were not uniform in leaf material. Also, the material often lacked uniformity so that one bale might have more stems than another.

In the past, non-uniform material has not been a major concern because such material was intended generally for use in industrial scale farming operations. Fodder and forage in such operations are ground and pre-mixed with vitamins, other feeds, and other nutritional constituents to form a total mix ration (TMR). However, end users owning smaller operations often do not have the equipment necessary to grind and break apart such compacted fodder and mix it with additives. Small farming operations generally distribute the compressed forage or fodder material, as is, to the animals without forming a TMR material. It has been determined that owners of such operations prefer for the material to have the leaves of the forage still intact.

Another issue with known compacted bales relates to the fiber length of the fodder or forage used to form the bale. In general, the majority of the fibers are often longer than 5 inches. End users, however, prefer that the length of such material be no longer than 5 inches. Fibers that are too long typically are not consumed entirely by a cow or similar forage consuming animal. This means less fiber is consumed and more is wasted. It is desired that a lesser amount of the fodder or forage be wasted. As such, it is desired to have a method and resultant bale that is comprised primarily of fibers having a length of 5 inches or less. More particularly, it is desired to have a method to produce forage and fodder material having a generally pre-determined length. The fibers of the bale should also contain a substantial portion of the leaves indigenous to the forage. Also, the controlled fiber length allows small end users to use the forage in small TMR mixers.

Production of forage bales for shipping or export, can be expensive. Known methods for forming the bales have initially kept the baling twine or wrapping intact throughout the process, until compressed. Maintaining the integrity of the baling twine is disadvantageous because it increases cost. More care is required to be taken to ensure that the bales to be processed are aligned correctly and cut at a suitable position so as not to cut the twine. Such a method is labor intensive and, consequently, increases cost. For this reason, it is desired to have a method or device that is economical to use.

Various forms of animal fodder and forage such as, for example, hay or alfalfa, are generally baled into rectangular shapes to facilitate handling and storage. During the baling process, the hay is collected and compressed into dense tightly packed bales. In the bales, most of the stems of the hay are typically aligned perpendicular to the longitudinal axis of the bale. Alignment of the stems in this direction tends to keep the bale of hay from breaking or falling apart. Therefore, the bales generally stay together in a continuous mass or a series of interlocking portions. In order for a compressed bale of hay to be distributed to animals as feed, or presented to mixing and feeding equipment, the hay must be separated from the bale. Various machines have been developed to break up or separate the hay from the bale, such as tub grinders. However, these machines generally create dust and airborne particles, making them environmentally incompatible for human working conditions. Additionally, these machines tend to pulverize the hay, destroying the fiber content with some loss of leaf, resulting in a large percentage of the hay.

Therefore, a fiber material cutting system is needed which will separate a compressed fiber material such as, for example, bales of hay, alfalfa, or straw, into substantially smaller portions. The fiber material is desirably cut while reducing the amount of dust or airborne particles which would be incompatible with human working conditions. Additionally, if the fiber material is a type of forage such as, for example, hay or alfalfa, it is advantageous to have substantially consistent length of the fiber. Furthermore, there should be minimal detachment of leaf from stem. Most importantly, the hay should contain as much of the original nutrients and fiber as possible.

SUMMARY OF INVENTION

The present invention relates to a method for forming a compressed and cut bale of fibrous material. The baled fibrous material is designed to be fed to animals that consume forage or fodder. Beneficially, the method produces a bale that is similar to a non-compressed "small" bale found in a field after baling hay, whereby the bale has minimized leaf separation, but, advantageously, the present bale has a substantially pre-determined fiber length. Additionally, the present invention relates to the resultant bale of fibrous material.

The present inventive method is initiated by obtaining an untreated and non-compressed bale of hay or other fibrous material, such as forage or fodder. Such bale can be of any of a variety of sizes and shapes. The strings or wrapping used to hold such bale together are cut or removed. The bale is then cut in at least one place so as to form at least two separate and distinct layers, with the layers then separated. Each layer is cut in at least one location to form a layer that can be separated into two separate tiers. Such tiers, however, are not separated but remain in contact. Preferably, the tier or layer with the cut is then cut vertically to form layer portions with a cut. The layer portion is then compressed to form a compressed and cut fibrous bale. The resultant bale will be compressed and have at least one cut so that the bale can be separated into separate and distinct layers. The fibers that form such layers are typically less than 5 inches in length. More importantly, the fiber length is substantially uniform and pre-determined.

Such bale is ideally suited for shipping, especially to locations that have insufficient or unavailable amounts of fodder and forage for animal consumption. The bales are further advantageous because they maintain, substantially, the integrity of the leaf structure, and can be easily pulled apart by an end user and fed to an animal without further processing. Also, the bales are cut in such a way that the sub-tiers have a pre-determined fiber length, with the fibers preferably less than 5 inches in length. This ensures that the majority of the fibrous material will be consumed by the animals. The present invention is further advantageous because it is comparatively a low cost system.

BRIEF DESCRIPTION OF INVENTION

DETAILED DESCRIPTION OF INVENTION

Figure 1:
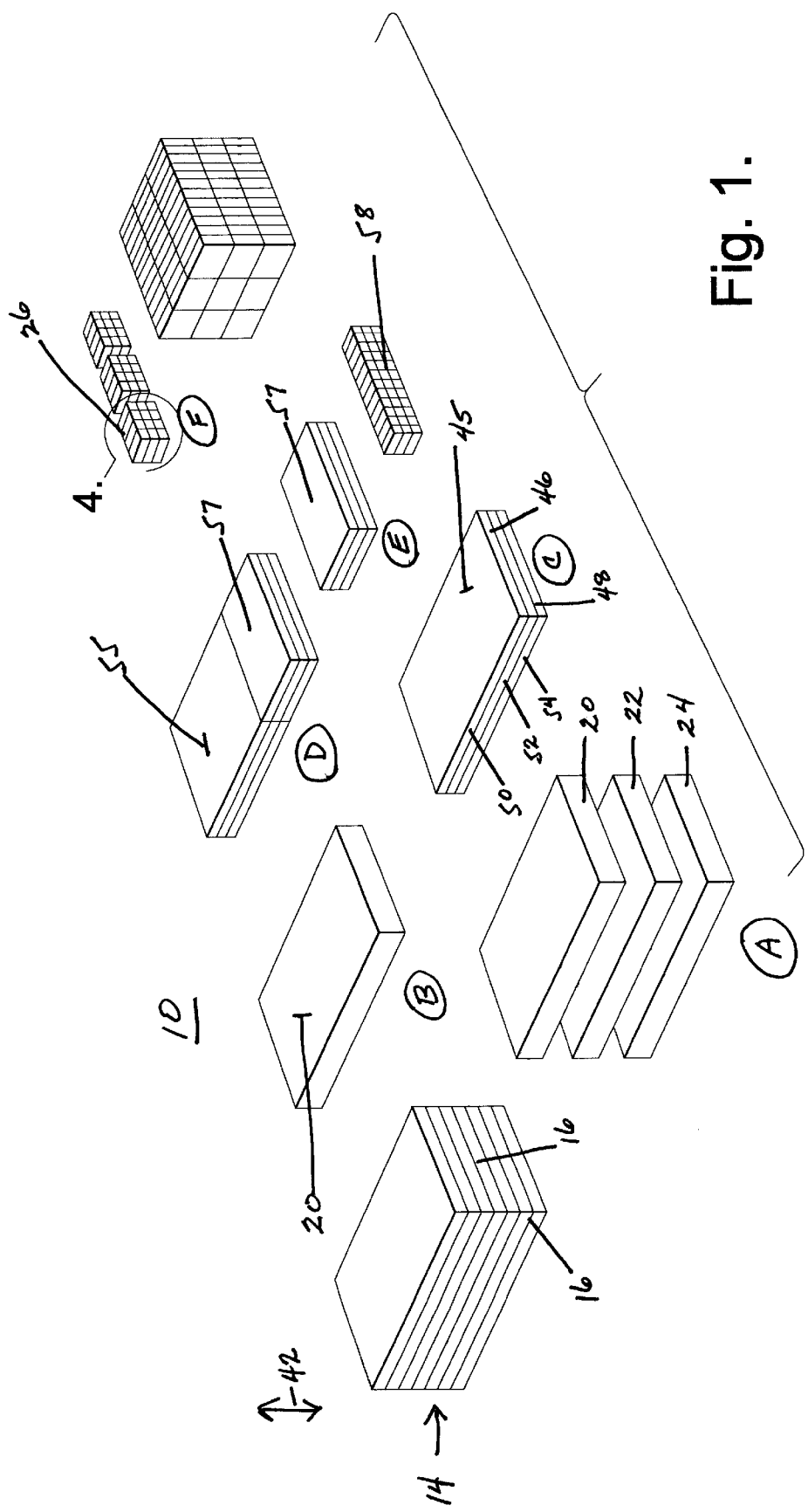
FIG. 1 is a schematic showing the results of the cutting and compressing steps of the present method.

The present invention relates to a method for producing a sliced and compressed bale or bundle of fibrous material. The method includes slicing, reducing in size, and then compressing a bale of forage or fodder to produce a smaller, compacted, and sliced resultant bale or bundle. The preferred inventive method 10 is schematically illustrated in FIG. 1, with the cutting and compressing system 12 of such method shown in FIG. 2. The present invention also relates to the resultant fibrous, compressed bale of material. In particular, the method includes the steps of obtaining a bale of fibrous material 14, known typically as a bale of hay, and shown in FIG. 3, removing or cutting the strings 16 used to hold such bale together, slicing the bale with a knife 18 or similar member to produce at least two and, more preferably, three 20, 22, and 24 layers, and slicing and compressing each layer to produce the resultant bundle or bale, for example, bales 26 or 58. The resultant fibrous product or bale 26, shown in FIG. 4, will have a pair of opposed ends 28, opposed faces 30, and opposed sides 32, with at least one cut 34, all shown in FIG. 4, passing through such bale 26, so that the bale can be separated into individual parts or layers, whereby the fibers that comprise the bale are preferably less than 5 inches in length.

Figure 3:
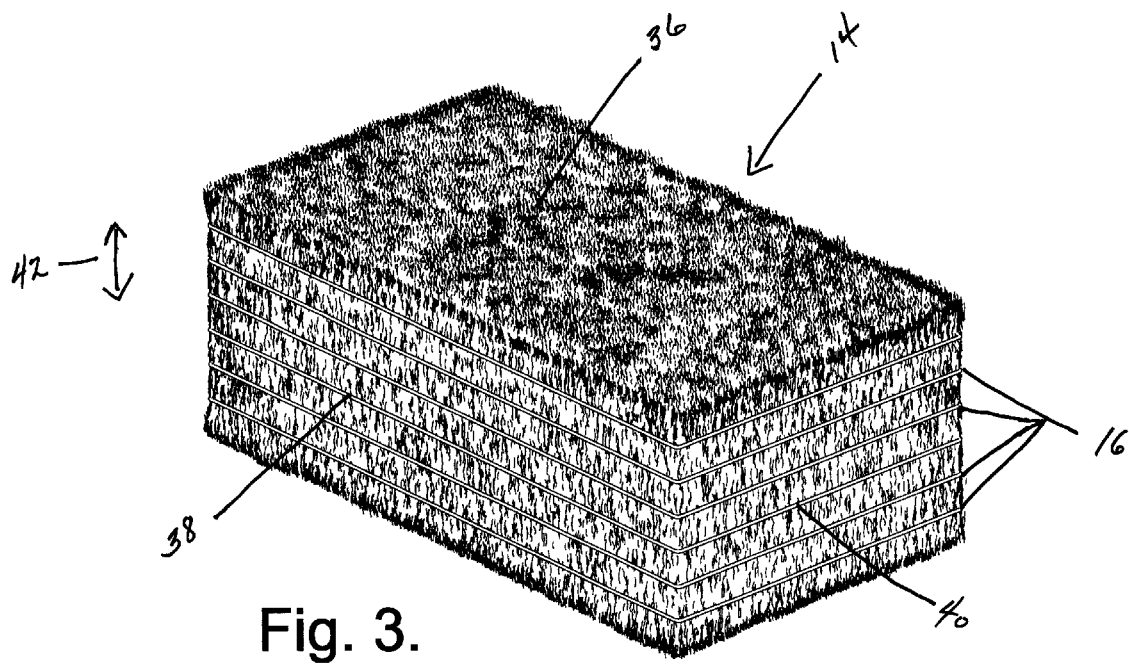
FIG. 3 is an exploded view of a bale bound with twine prior to cutting and compressing; and, FIG. 4 is an exploded view of a compressed and cut bale of the present invention.
Figure 4:
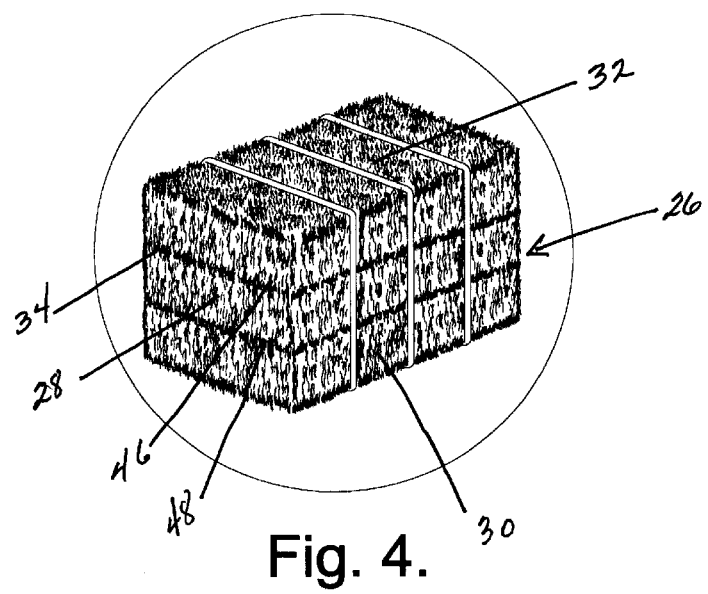

The method is initiated by obtaining bales of fibrous material 14 which are held together by twine or string 16, and which are shown more closely in FIG. 3. The bales are known generally as hay bales and are produced by hay baling machines known to the public. To distinguish from the finished bales 26 and 58, bale 14 will be referred to throughout as a hay bale 14. Such hay bales can be of any of a variety of sizes and shapes. Small hay bales which are 36 inches×24 inches×24 inches can be used, as well as larger hay bales. The preferred hay bale is typically rectangular and has six sides: two opposing cut sides 36, two opposing string sides 38, and two opposing end sides 40. Round hay bales having opposing ends and one continuous face may also be used. The more preferred hay bale used in the present process, has a rectangular shape and is approximately 96 inches long, 48 inches high, and 48 inches wide. As best shown by lines 16 in FIGS. 1 and 3, the hay bale is wrapped around the string sides 38 and end sides 40 with twine 16. The twine 16 or string holds the fibrous material which comprises the hay bale, in place. The preferred direction of the majority of the fibrous material within the hay bale is best shown by an arrow 42, found in FIG. 3. As shown by arrow 42, the fibers run generally parallel to one another and the ends of the fibers are typically at the cut sides 36 of the bale. Also, the hay bale 14 will typically have a density ranging between 12 lbs/ft$^3$ and 15 lbs/ft$^3$.

The hay bale 14 can be comprised of any of a variety of animal fodder and/or forage. Among the various types of animal fodder and forage are corn stalks, wheat stalks, hay, alfalfa, timothy grass, sudan grass, and any other of a variety of fibrous materials that can be consumed by a cow or similar animal that consumes forage or fodder.

Figure 2:
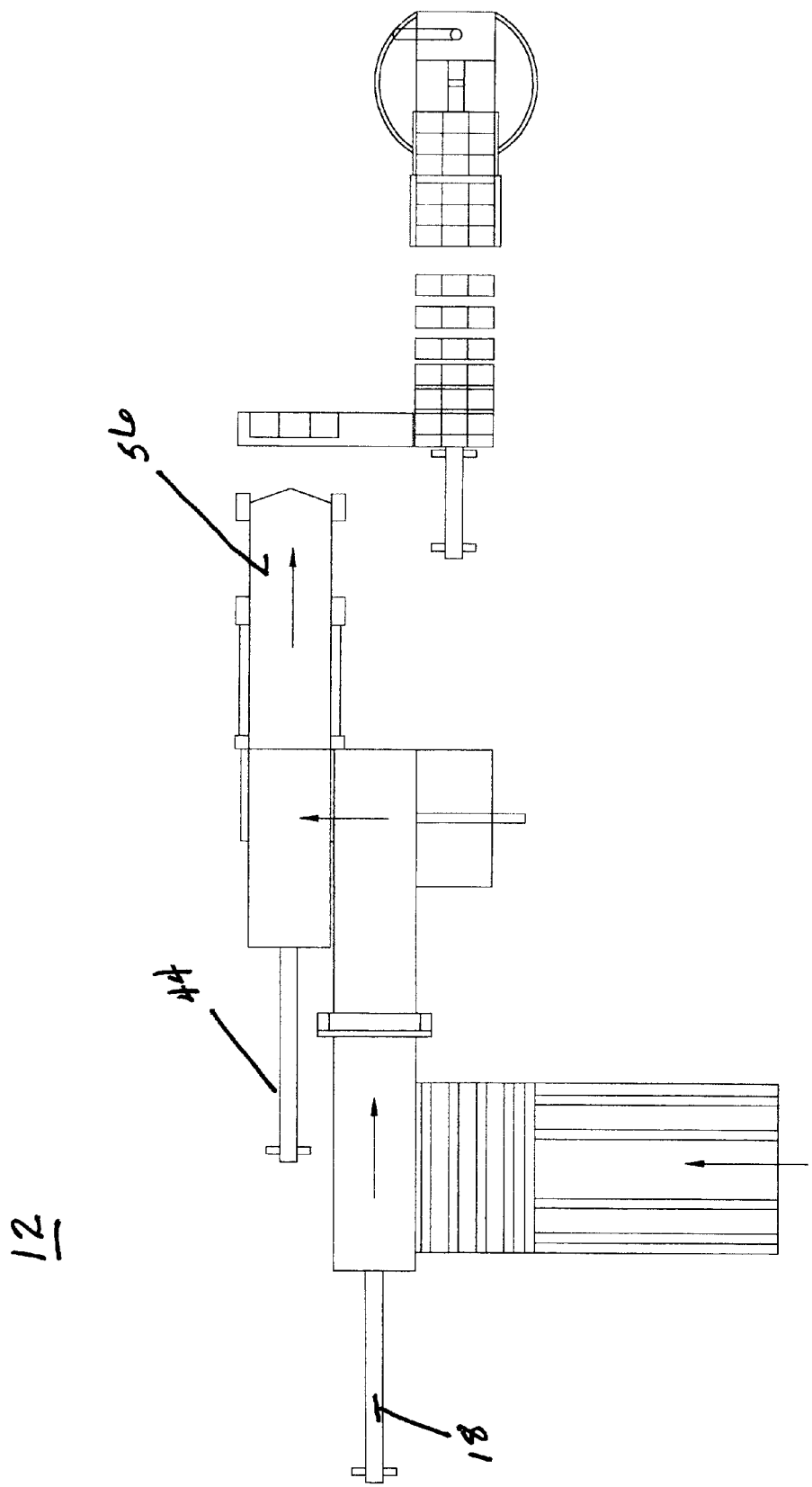
FIG. 2 is a top view of the system used to cut and compress the bales.

The hay bale 14 is placed into the system 12, shown in FIG. 2, whereby the strings or twine 16 are initially cut and removed from the hay bale. Once the strings 16 are cut, the hay bale 14 is positioned so as to hold it in place and slightly compress the material. Preferably, the wrapped hay bale of fibrous material is received and positioned "cut side up." This allows the hay bales 14 to be positioned in such a way so as to allow the blades to cut the bale perpendicular to the general fiber orientation 42. Regardless, the hay bale is then sliced with a knife or similar cutting member 18 into at least two separate layers 20 and 22 and, more preferably, three separate layers 20, 22, and 24. This is shown at Step A at FIG. 1. The slicing mechanism 18 that is used to cut the hay bale 14 and has a knife or blade that will pass through the hay bale to form separate and distinct layers. Preferably, the resulting layers 20, 22, and 24 are between 60 and 90 inches long, about 51 inches wide, and 16 inches high. Such layers, however, can vary in size and dimension, dependent upon the desired final general fiber length.

Each layer or tier 20 is then separated from the other layers or tiers 22 and 24. This is illustrated at Step B. In particular, the top sliced tier is preferably pushed on one of its string sides 38 such that it is moved from the top of the bottom layer or layers while remaining cut side up. Alternatively, the bottom tier could first be pushed from underneath the top tier or tiers. However, in any case, the separated tier remains preferably in its cut side up position.

Next, each of the separated tiers or layers are further processed, as shown in FIG. 1 at Step C. Each layer 20 is sliced a second time by a secondary cutting member or knife member 44, shown in FIG. 2, to form a layer or tier 45 having cuts or slices. The secondary slice will pass through the layer 45, with it preferred to slice the layer in two places 46 and 48 so that the slices are parallel to one another and form three sub-tiers 50, 52, and 54. The secondary slices 46 and 48 are intended to form a layer having fibers of a substantially pre-determined length. More particularly, the separated tier or layer 45 will remain, preferably in its cut side up position, and is further sliced into 3 sub-tiers, one positioned on top of another. It is most preferred if the slices are such that each layer can be divided into sub-tiers, less than 5 inches in height. In this instance, the sliced sub-tiers 50, 52, and 54 are not separated, but remain stacked on top of each other. The lines 46 and 48 shown at Step C in FIG. 1 illustrate the fact that the separated tier has been sliced into three sub-tiers. The lines 46 and 48 are not indicative of twine wrappings since the twine was already removed. Resultingly, a layer 45 is formed having sections that can be later separated, with the layer having at least one slice dividing it into two non-separated sections.

As shown, it is most preferred if, in both the primary and secondary slicing steps, the slices are made horizontal so that they travel lengthwise across the layer or hay bale. The slices, however, may be administered vertically, as long as the resultant section can be separated when fed to animals, into sections where the fiber length is preferably less than 5 inches. Again, it is preferred if the secondary slice is perpendicular to the fiber orientation 42 of the bale or layer.

The layer or tier 45, sliced into non-separated sub-tiers or layers 50, 52, and 54, is preferably sliced again. Such step is optional and dependent upon the size of the layers. This third slice is preferably vertical and divides the layer 45 into separate portions 55 and 57, shown at Step D. The portions or sub-parts, 57 for example, are separated and then placed preferably in a bale press 56. The layer or tier 57 is then compressed, Step E, to tightly pack and densify the layer and form the resulting bale 58. Preferably, the bale or portion 58, after compression, is about 56 inches in length, 13 inches wide, and 13.5 inches tall, and can, optionally, be cut and divided into three or four distinct shorter bales. Other dimensions, however, may be used dependent upon the end use and the way in which the material is to be shipped.

The optional cutting of the compressed layer or portion 58 is shown at Step F and results in the formation of bales 26 that are of a shorter length. It is preferred if the bales 26 have a length of approximately 19 inches. The entire portion 58 is cut into preferably three or four smaller bales 26 such that three units of sliced sub-tiers are cut vertically into smaller sections. The bales 26 may then be stacked and wrapped to form a bale 60 and shipped, or they may be shipped without bundling, based on end user's preference.

The resultant bale 26 is compacted and has at least one slice 46 or 48 that allows the bale to be separated into at least two distinct tiers. The bale can be wrapped with twine to hold it in place. Preferably, the bale is approximately 19 inches long, 14.5 inches high, and 14 inches wide. The fibers that comprise the bale are generally less than 5 inches long; however, any pre-determined fiber length can be used. Also, the fodder will have leaves substantially intact so that leaf separation is minimized. The bale will typically have a density greater than 12 lbs/ft$^3$. More preferably, the bale will have a density equal to between 20 lb/ft$^3$ and 35 lbs/ft$^3$.

Thus, there has been shown and described a novel method and product associated with producing cut and compressed bales, which fulfills all of the objects and advantages sought therefor. It will be apparent to those skilled in the art, however, that many changes, variations, modifications, and other uses and applications for the subject product are possible, and also changes, variations, modifications, and other uses and applications which do not depart from the spirit and scope of the invention are deemed to be covered by the invention which is limited only by the claims which follow.

What is claimed is:

1. A method of cutting and compressing a block or unit of fibrous material to produce a sliced and compressed bale of fibrous material, the block of fibrous material is held together by at least one string member extending around the block, and has opposed ends and at least one side, wherein said method comprises:

inserting the block into an inlet, pre-compressing the block, the inlet being formed to maintain the partial compression of the block;

removing the string used to hold the block;

slicing the block to form at least two separate layers;

separating said layers;

slicing each layer to form a sliced layer having at least two sub-tiers that are not separated, with the slice traversing either the layer's width, length, or height; and, compressing said sliced layer, having non-separated sub-tiers, to form a compressed and sliced bale.

2. The method of claim 1 wherein said slicing steps (b) and (d) are performed perpendicular to the block's fiber orientation.

3. The method of claim 1 wherein said method includes tying said compressed and sliced bale with a plurality of twine.

4. The method of claim 1 wherein said method comprises slicing and separating said compressed and sliced bale to form separate bales.

5. The method of claim 1 wherein said method comprises cutting said sliced layer having non-separated sub-tiers to form a layer portion of a shorter length.

* * * * *